(12) United States Patent
Norris et al.

(10) Patent No.: US 6,994,310 B2
(45) Date of Patent: Feb. 7, 2006

(54) STEPPER MOTOR DRIVEN VALVE FOR THERMAL MANAGEMENT AND ASSOCIATED METHOD OF USE

(75) Inventors: Robert R. Norris, Dublin, OH (US); Gary L. Russo, Delaware, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 88 days.

(21) Appl. No.: 10/605,875

(22) Filed: Nov. 3, 2003

(65) Prior Publication Data

US 2004/0211929 A1 Oct. 28, 2004

Related U.S. Application Data

(60) Provisional application No. 60/465,617, filed on Apr. 24, 2003.

(51) Int. Cl.
*F16K 31/02* (2006.01)

(52) U.S. Cl. .................... 251/129.11; 251/272
(58) Field of Classification Search ............ 251/129.11, 251/129.12, 129.13, 266, 272; 123/41.09, 123/41.1

See application file for complete search history.

(56) References Cited

U.S. PATENT DOCUMENTS

| | | | |
|---|---|---|---|
| 4,537,158 A | * | 8/1985 | Saur .......................... 123/41.1 |
| 4,550,693 A | * | 11/1985 | Saur .......................... 123/41.1 |
| 4,593,881 A | | 6/1986 | Yoshino |
| 4,609,176 A | | 9/1986 | Powers |
| 4,930,455 A | | 6/1990 | Creed et al. |
| 4,969,628 A | | 11/1990 | Reich et al. |
| 4,986,085 A | | 1/1991 | Tischer |
| 5,060,910 A | | 10/1991 | Iwata et al. |
| 5,083,745 A | | 1/1992 | Tischer |
| 5,137,255 A | | 8/1992 | Sumida et al. |
| 5,189,991 A | * | 3/1993 | Humburg ................... 123/41.1 |
| 5,255,891 A | | 10/1993 | Pearson et al. |
| 5,363,713 A | | 11/1994 | Pearson |
| 5,364,066 A | | 11/1994 | Dorste et al. |
| 5,419,531 A | | 5/1995 | Hoehn |
| 5,738,048 A | * | 4/1998 | Suzuki et al. ............... 123/41.1 |
| 5,860,595 A | | 1/1999 | Himmelsbach |
| 5,868,311 A | | 2/1999 | Cretu-Petra |
| 5,899,437 A | | 5/1999 | Quarre |
| 5,967,185 A | | 10/1999 | Baruschke et al. |

(Continued)

FOREIGN PATENT DOCUMENTS

| | | |
|---|---|---|
| DE | 1126188 B | 3/1962 |
| EP | 0 987 477 A2 | 3/2000 |
| JP | 8226564 | 9/1996 |
| JP | 11002353 | 1/1999 |

*Primary Examiner*—Justine R. Yu
*Assistant Examiner*—Peter deVore
(74) *Attorney, Agent, or Firm*—Blackwell Sanders Peper Martin LLP

(57) ABSTRACT

A valve for regulating fluid flow and associated method of use. The valve includes a stepper motor, a first valve portion having an inlet port for receiving fluid into the valve, a second valve portion having an outlet port for dispensing fluid from the valve, a third valve portion located between the first valve portion and the second valve portion, a first member that is rotatable and operatively attached to the stepper motor, and a second member, having a first portion and a second portion, which engages the first member for linear movement of the second member between a first position and a second position when the first member is rotated by the stepper motor to block fluid flow when the second member is located in the first position and allow fluid flow when the second member is located in the second position.

39 Claims, 8 Drawing Sheets

U.S. PATENT DOCUMENTS

| | | |
|---|---|---|
| 5,992,822 A | 11/1999 | Nakao et al. |
| 6,155,798 A | 12/2000 | Deininger et al. |
| 6,157,103 A | 12/2000 | Ohta et al. |
| 6,158,714 A | 12/2000 | Lembcke et al. |
| 6,170,492 B1 | 1/2001 | Ueda et al. |
| 6,197,192 B1 | 3/2001 | Smith-Haddon et al. |
| 6,228,019 B1 | 5/2001 | Phillips et al. |
| 6,286,464 B1 | 9/2001 | Abraham et al. |
| 6,286,764 B1 | 9/2001 | Garvey et al. |
| 6,349,920 B1 | 2/2002 | Lewis et al. |
| 6,375,086 B1 | 4/2002 | Babin et al. |
| 6,460,567 B1 | 10/2002 | Hansen, III et al. |
| 6,508,211 B1 * | 1/2003 | Asano ............. 123/41.1 |
| 6,598,565 B2 * | 7/2003 | Fishman et al. ........... 123/41.1 |
| 6,679,201 B2 * | 1/2004 | Murakami et al. ......... 123/41.1 |
| 6,688,262 B2 * | 2/2004 | Murakami et al. ......... 123/41.1 |
| 2002/0017327 A1 | 2/2002 | Kawaai et al. |
| 2002/0189693 A1 | 12/2002 | Berto |

* cited by examiner

STEPPER MOTOR DRIVEN VALVE FOR THERMAL MANAGEMENT AND ASSOCIATED METHOD OF USE

CROSS REFERENCE TO RELATED APPLICATIONS

This patent application claims priority to U.S. Provisional Patent Application Ser. No. 60/465,617 filed Apr. 24, 2003.

BACKGROUND OF INVENTION

The current state of the art for controlling the temperature for an engine, e.g., an internal combustion engine, is by using a mechanical wax pellet thermostat to control the flow of coolant to the radiator for a vehicle. This thermostat is a poppet-type of valve that is either fully closed at room temperature or fully open when an engine temperature reaches a predetermined set point.

There are a number of problems associated with the typical mechanical wax pellet thermostat. Since the temperature-sensing element i.e., wax pellet, must be positioned in the flow stream, there is a very high-pressure drop with associated losses. For engine systems that have relatively large water pumps to provide the necessary coolant flow rates and associated cooling, significant power from the engine must be utilized. This diversion of power affects the performance of the vehicle and wastes fuel.

Moreover, the fixed-point temperature setting for the engine is primarily determined by the physical composition of the temperature sensing element, i.e., wax pellet. The softening point of any particular wax pellet is fixed and cannot be changed. Therefore, the thermostat is absolutely static with the thermostat either blocking fluid flow or providing maximum fluid flow depending on whether the set temperature is achieved. There is absolutely no dynamic control of engine temperature with a conventional thermostat.

The present invention is directed to overcoming one or more of the problems set forth above.

SUMMARY OF INVENTION

In one aspect of this invention, a valve for regulating fluid flow is disclosed. This valve includes a stepper motor, a first valve portion that includes an inlet port for receiving fluid into the valve, a second valve portion that includes an outlet port for dispensing fluid from the valve, a third valve portion located between the first valve portion and the second valve portion, a first member that is rotatable and operatively attached to the stepper motor, and a second member, having a first portion and a second portion, that is engageable with the first member for linear movement of the second member between a first position and a second position when the first member is rotated by the stepper motor, wherein the first member and the second member are located within the third valve portion and the first portion of the second member located in the first position can block fluid flow between the first valve portion and the third valve portion and the second portion of the second member located in the second position can allow fluid flow between the first valve portion and the third valve portion.

In another aspect of this invention, a method for regulating fluid flow with a valve is disclosed. The method includes rotating a first member that is operatively attached to a stepper motor within a valve that includes a first valve portion having an inlet port for receiving fluid into the valve, a second valve portion having an outlet port for dispensing fluid from the valve and a third valve portion located between the first valve portion and the second valve portion, and moving a second member, having a first portion and a second portion, from a first position to a second position through interengagement with the rotating first member, wherein the first portion of the second member located in the first position can block fluid flow between the first valve portion and the third valve portion and the second portion of the second member located in the second position can allow fluid flow between the first valve portion and the third valve portion.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

DETAILED DESCRIPTION

Figure 1:
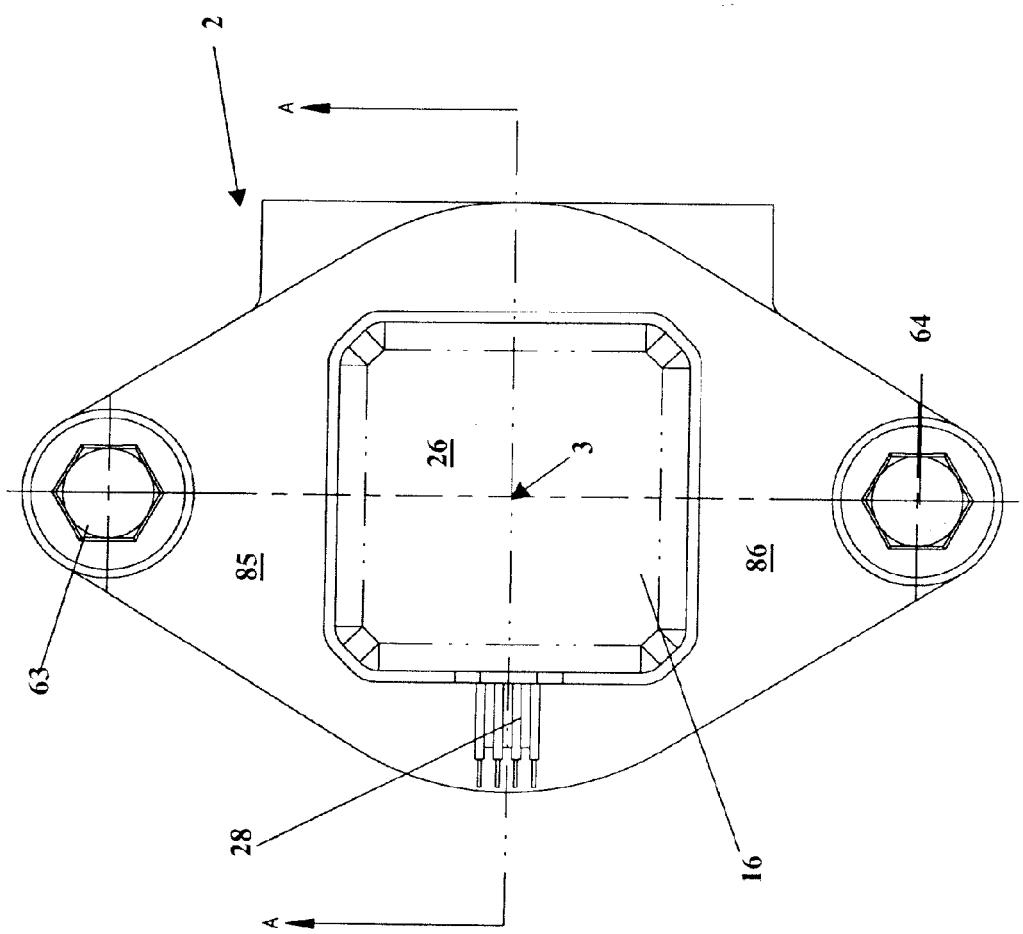
FIG. 1 is a top view a stepper motor driven valve in accordance with the present invention.

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as to obscure the present invention. For example, the invention can be applied to virtually any type of device that can benefit from controlled fluid flow. Moreover, this invention can be applied to virtually any type of application that utilizes fluid as a coolant for reducing heat. Although the preferred application involves the thermal management of an engine, e.g., an internal combustion engine, a wide variety of applications that can benefit from thermal management brought about by fluid flow, throughout a range, will be applicable and not necessarily those applications related to motorized vehicles. The fluid is preferably coolant; however, a wide range of fluids may suffice.

Referring now to the drawings, and initially to FIGS. 1, 2, 3 and 6, where a valve that is utilized to control fluid, e.g., coolant, flow to provide thermal management is generally indicated by numeral 2. The valve 2 is shown in a default or unpowered position in FIG. 2. There is a biasing mechanism 4, which is preferably, but not necessarily, in the form of a return spring. The biasing mechanism 4 applies a load to a plunger 6. This plunger 6 is preferably aligned with a vertical axis or centerline 3 for the valve 2 in the illustrative, but nonlimiting, embodiment. However, this is not a necessity.

The plunger 6 preferably includes a first portion 9 and a second portion 11. The first portion 9 can include a wide variety of geometric shapes and configurations. Preferably, but not necessarily, the first portion 9 is cylindrical or at the very least a portion of the lower portion 9 is cylindrical. Preferably, there is at least one protrusion on the outer circumference of the lower portion 9 and optimally, there is first, upper protrusion 66, a second, middle protrusion 67 and a third, lower protrusion 68. Preferably, the plunger 6, having a longitudinal axis, includes at least one fluid passage 135, e.g., four (4) fluid passages, that is preferably parallel to the longitudinal axis of the plunger as shown in FIG. 5.

Figure 5:
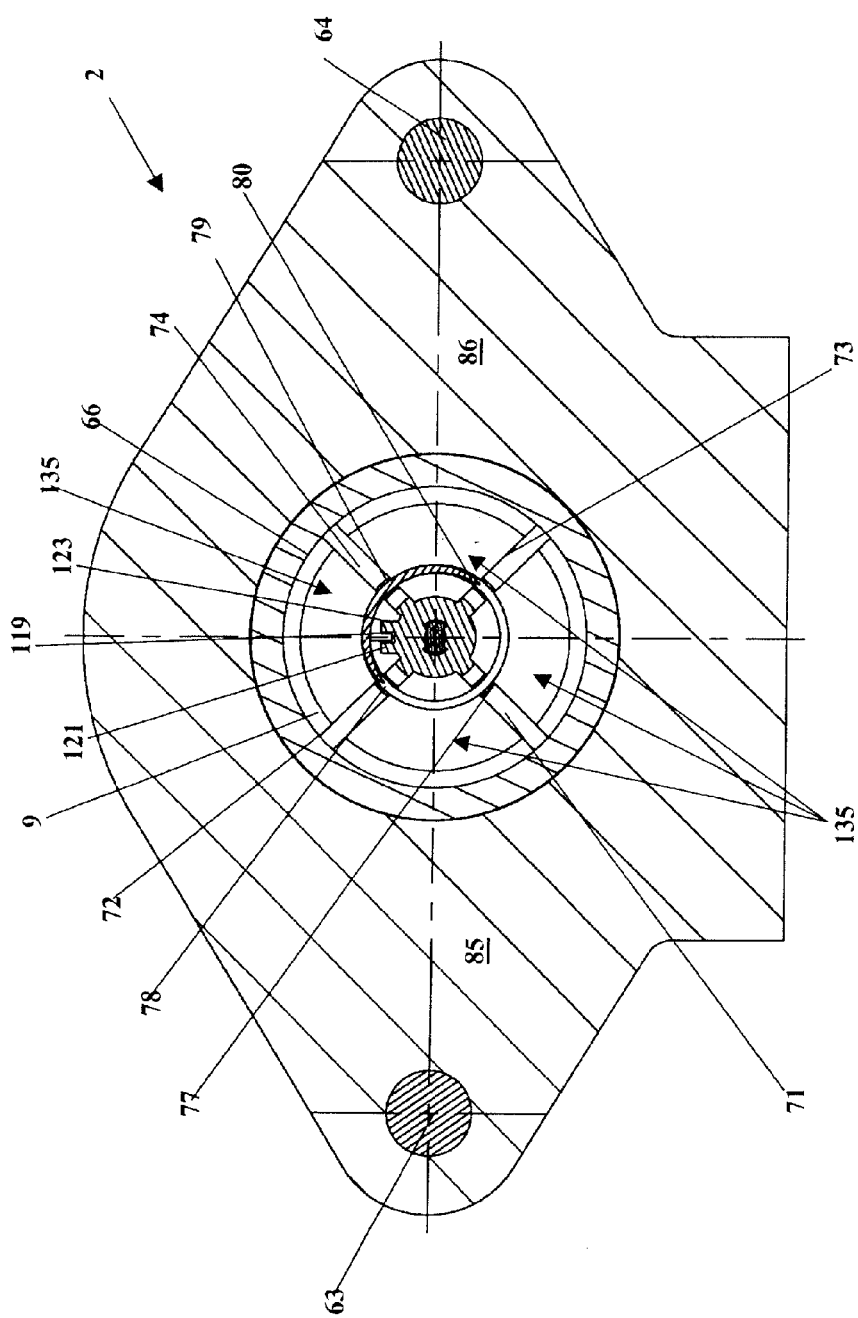
FIG. 5 is a sectional view of the stepper motor driven valve, taken along Line B—B in FIG. 3, in accordance with the present invention.

The second portion 11 of the plunger 6 preferably, but not necessarily, includes a series of triangular support portions 71, 72, 73 and 74, as best shown in FIG. 5. The triangular support portions 71, 72, 73 and 74, each preferably include a slot 77, 78, 79 and 80, respectively, that supports the bottom portion of the biasing mechanism, e.g., return spring 4.

Figure 2:
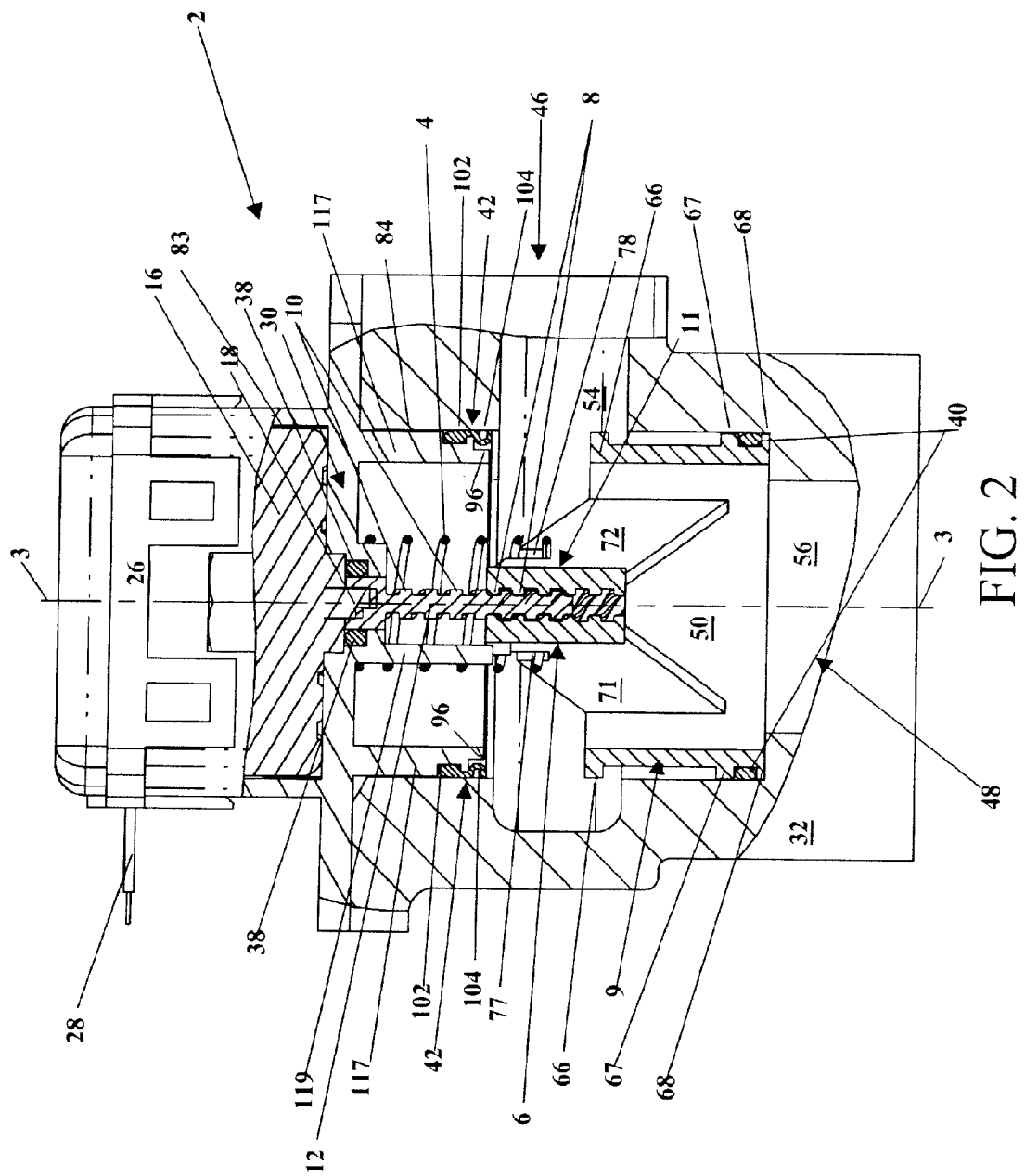
FIG. 2 is a sectional view of the stepper motor driven valve, taken along Line A—A as shown in FIG. 1, in accordance with the present invention in an open position.
Figure 3:
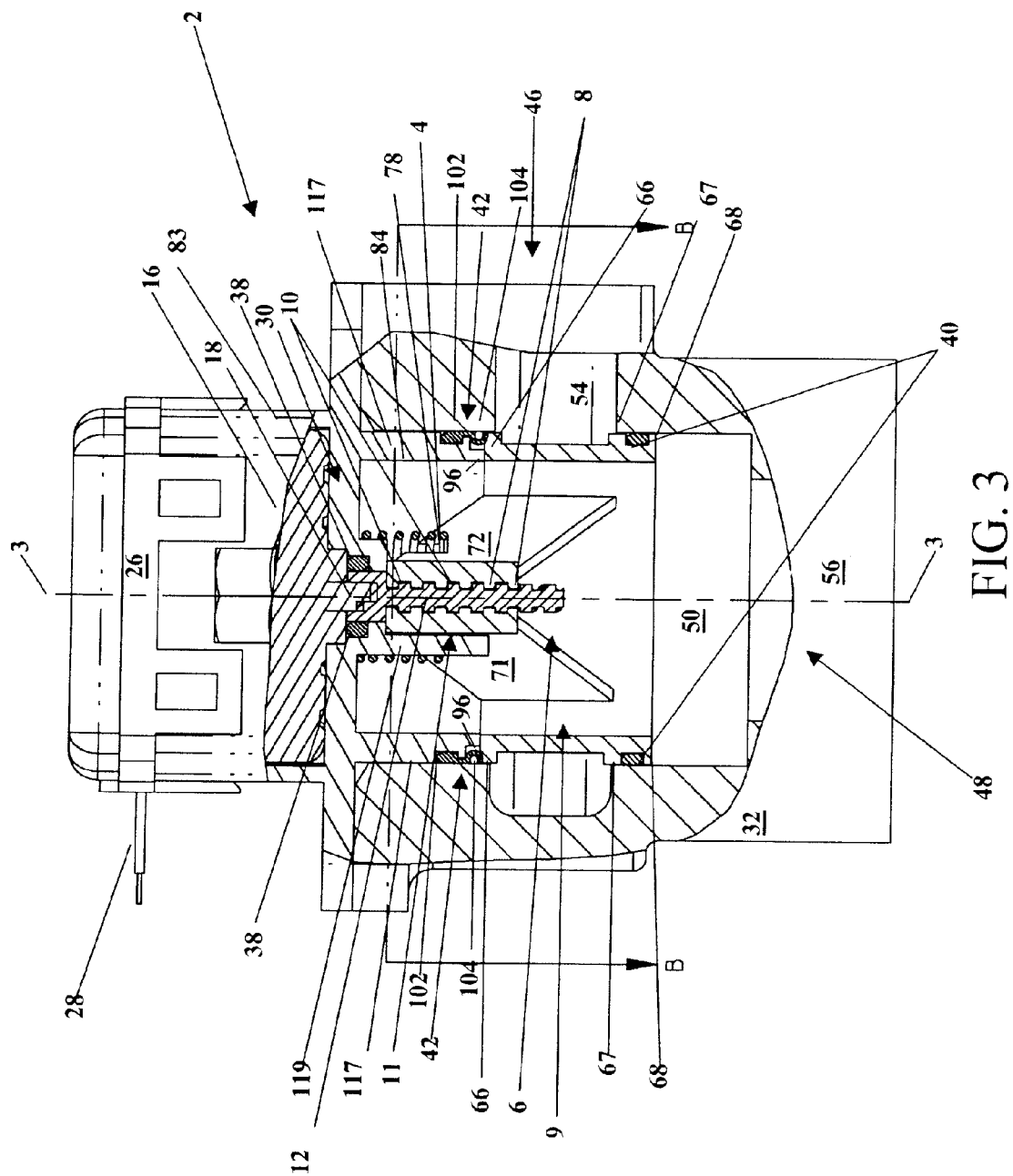
FIG. 3 is a sectional view of the stepper motor driven valve, taken along Line A—A as shown in FIG. 1, in accordance with the present invention in a closed position.
Figure 4:
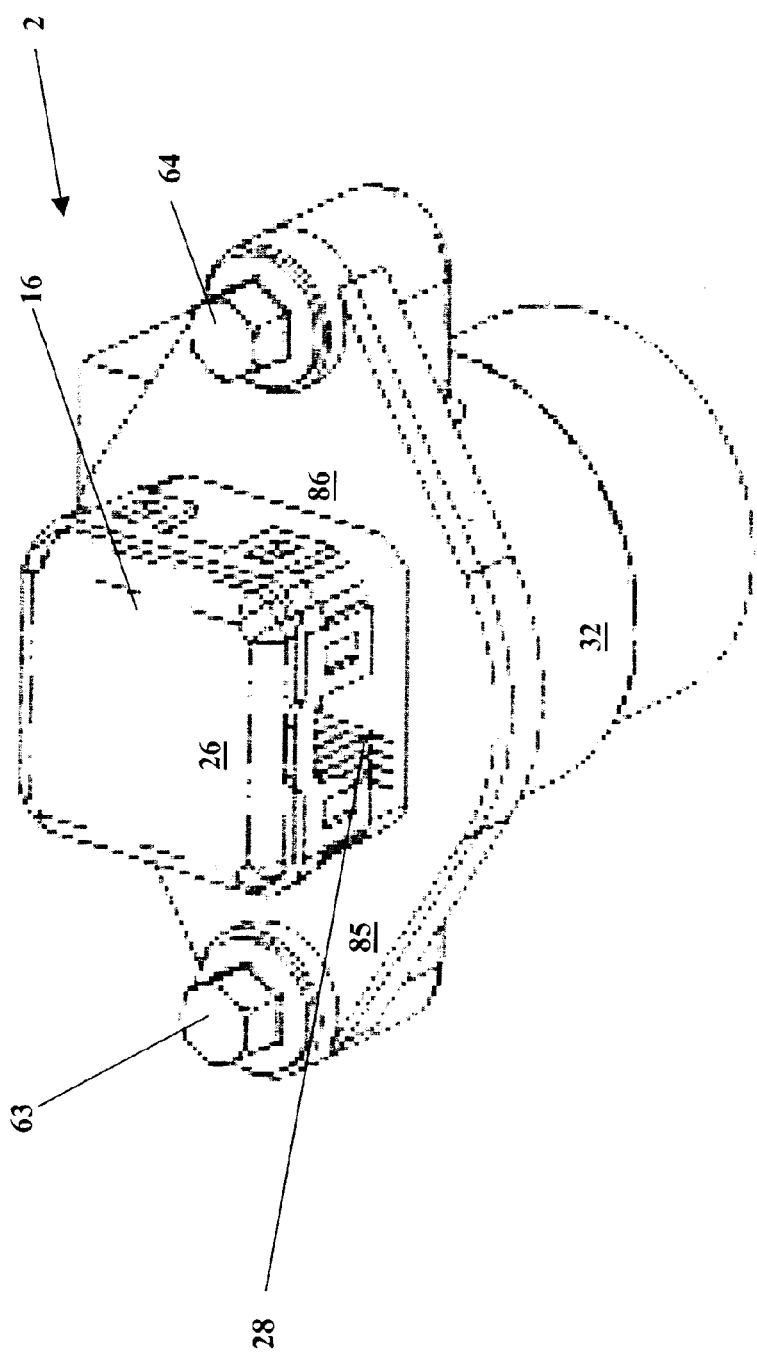
FIG. 4 is a perspective view of the stepper motor driven valve in accordance with the present invention.

As shown in FIGS. 2 and 3, there are a plurality of female threads or a plurality of female indentations 8 (collectively can be referenced as "indentations") that are integrally formed and located therein that are capable of mating with a plurality of male protrusions or a plurality of male threads 10 (collectively can be referenced as "protrusions") in a screw 12. Due to the force of the biasing mechanism, e.g., return spring 4, there are both translational and rotational loads applied to the plunger 6.

Figure 6:
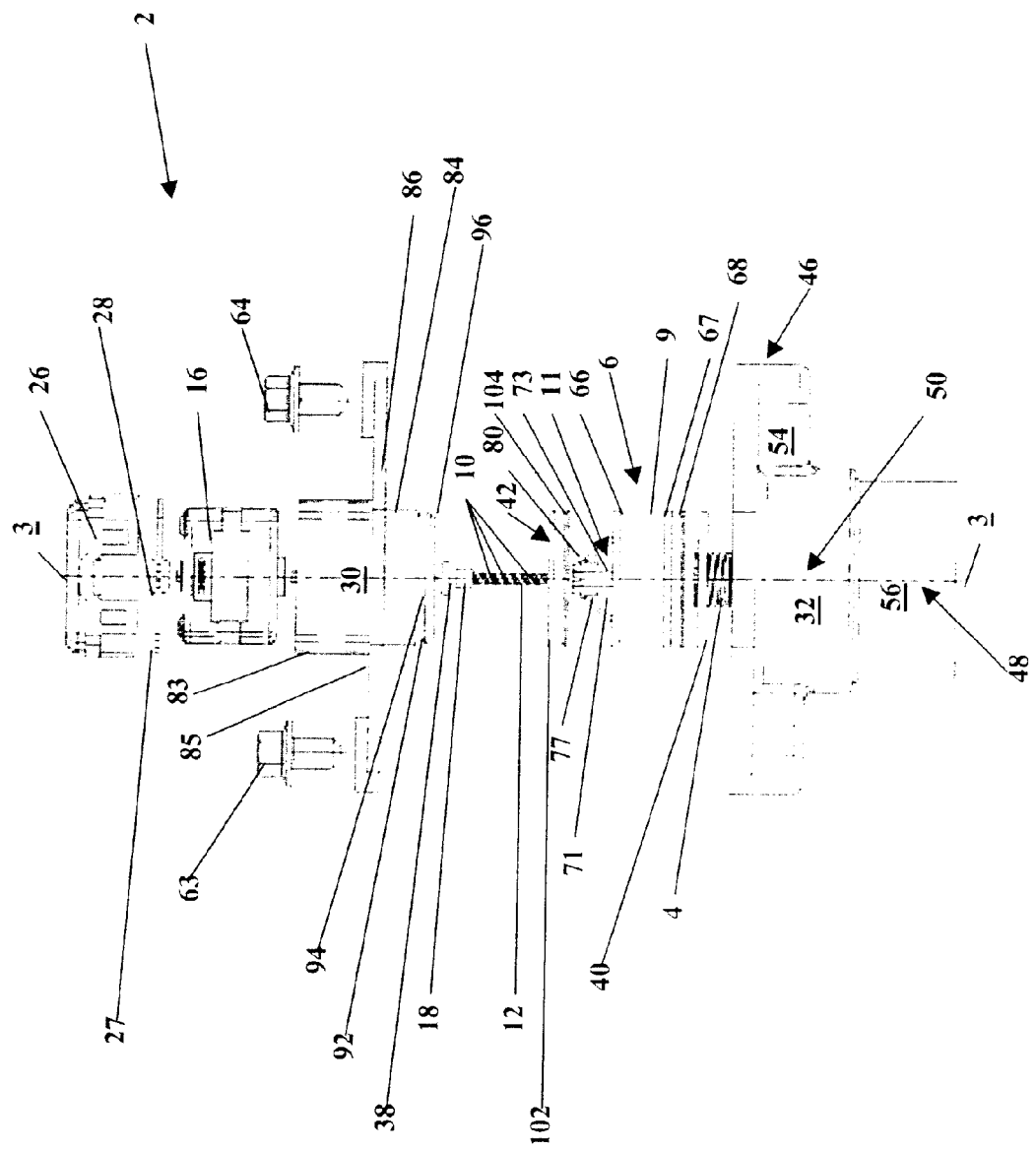
FIG. 6 is an exploded view of the stepper motor driven valve in accordance with the present invention.

Therefore, when the screw 12 rotates, the plurality of male protrusions or threads 10 engage the plurality of the female threads or indentations 8 in the plunger 6 so that the plunger 6 can move up or down along the vertical axis or centerline 3 depending on the direction of rotation of the screw 12. The screw 12 is operatively connected to a stepper motor 16. Preferably, the screw 12 is mechanically connected with hardware to the stepper motor 16; however, attachment by adhesives, thermal bonding and other methods will suffice. The preferred hardware is a connecting sleeve portion 18, which is preferably, but not necessarily, part of the screw 12, which connects to the rotor 20 for the stepper motor 16, as shown in FIGS. 2, 3 and 6. An illustrative, but nonlimiting, example of a stepper motor 16 includes SKC Motor Number XE-2002-0962-00 manufactured by Shinano Kenshi Corp., having a place of business at 5737 Mesmer Avenue, Culver City, Calif. 90230. However, a wide variety of stepper motors 16 will suffice for the present invention.

A wide variety of materials can be utilized for the main components of the valve 2 with the exception of the stepper motor 16 and fluid sealing mechanisms. One illustrative, but nonlimiting, example includes 1503-2 grade of resin that includes nylon 6/6 that is glass reinforced and manufactured by TICONA®, having a place of business at 90 Morris Avenue, Summit, N.J. 07901. However, a wide variety of other materials will suffice for this application. One illustrative, but nonlimiting, example of material for the plunger 6 includes an acetal copolymer. An acetal copolymer is a polyoxymethylene (POM) with a high crystallinity delivering high strength, stiffness, toughness, and lubricity over a broad range of temperatures and chemical environments. An acetal copolymer can be processed by many conventional means including injection molding, blow molding, extrusion and rotational casting. One illustrative, but nonlimiting, example of material for the screw 12 includes nylon 6 combined with polytetrafluoroethylene (PTFE) to reduce friction.

A feature of this valve 2 is the force balance between the stepper motor 16 and the biasing mechanism, e.g., return spring 4. This valve 2 is designed so that when an appropriate signal is provided to the stepper motor 16, there is sufficient force to turn the screw 12 that moves the plunger 6 to compress the biasing mechanism, e.g., return spring 4, and close the valve 2. The construction and design of the biasing mechanism, e.g., return spring 4, can vary greatly to comport with the wide variety of stepper motors utilized to create to balance the force. Conversely, there must be enough force in the biasing mechanism, e.g., return spring 4, to turn the screw 12 to move the plunger 6 that rotates the stepper motor 16 when power is removed from the stepper motor 16 so that the valve 2 can be opened. Therefore, a feature of this invention is the ability for the valve 2 to go to a full open position as a failsafe when power is removed from the stepper motor 16.

As shown in FIGS. 1–4 and as best shown in FIG. 6, the stepper motor 16 includes a protective outer housing end cap 26 that covers the outer top portion of the stepper motor 16. As shown in FIG. 6, there is a gasket 27 having an electrical terminal connector 28 to provide electrical connections to the terminals (not shown) on the stepper motor 16. This electrical terminal connector 28 provides a simple electrical interface that can be easily connected to other components in an electrical system.

As shown in FIGS. 2, 3, 5 and 6, located below the stepper motor 16 is a valve body 32. There is a cover member 30 that preferably, but not necessarily, includes a support portion and preferably an upper motor support portion 83 and a lower portion 84. Preferably, but not necessarily, both an upper motor support portion 83 and a lower portion 84 are cylindrical depending on the geometric shape of the stepper motor 16. Extending outward from between the upper motor support portion 83 and the lower portion 84 is at least one sealing portion that preferably includes a first outer member 85 and a second outer member 86. The first outer member 85 and the second outer member 86 operate to seal the cover member 30 to the valve body 32, as shown in FIGS. 1, 4, 5 and 6.

The upper motor support portion 83, the lower portion 84, the first outer member 85 and the second outer member 86 may all be part of an integral cover member 30 or each may be separate parts connected together and any combination thereof. Preferably, the cover member 30 is mechanically connected with hardware to the valve body 32; however, attachment by adhesives, thermal bonding and other methods will suffice. Preferably, a first bolt 63 and a second bolt 64 are utilized to secure the first outer member 85 and the second outer member 86, respectively to the valve body 32.

As shown in FIGS. 2, 3 and 5, the lower portion 84 includes an outer flange 117 and at least one protruding member 119 located within the outer flange 117. There is preferably a pair of retaining guide members 121 and 123 located on the second portion 11 of the plunger 6, as shown in FIG. 5. This provides an anti-rotational feature so that the plunger 6 only translates force along the centerline 3 of the valve 2.

Preferably, but not necessarily, located near a bottom portion of the outer surface of the outer flange 117 is at least one protrusion 92 that forms at least one u-shaped channel 94, which is followed by an extending lip portion 96, as shown in FIG. 6.

There is a radial seal 42 located on the inside of the valve body 32. The radial seal 42 may include a wide variety of geometric shapes and configurations; however, the preferred embodiment includes at least one rectangular portion 102 and at least one c-shaped portion 104. The rectangular portion 102 is preferably located within the u-shaped channel 94 in the outer flange 117 and the c-shaped portion 104 is preferably positioned adjacent to the extending lip portion 96. A seal made of polytetrafluoroethylene (PTFE) or a lip seal may also be utilized. The radial seal 42 keeps the load low that is due to the differential pressure.

There is a first o-ring 38 located between the cover member 30 and the connecting sleeve portion 18 of the screw 12 and the stepper motor 16. There is also a second o-ring 40 located between the biasing member, e.g., return spring 4, and the plunger 6. An illustrative, but nonlimiting material can include a Nitrile/Buna-N type of material as well as EPDM at higher temperatures. An illustrative, but nonlimiting, manufacturer can include Quality Synthetic Rubber, Inc. (QSR), having a place of business at 1700 Highland Road, Twinsburg, Ohio 44087.

The valve body 32 includes an inlet port 46 for receiving fluid and an outlet port 48 for releasing fluid. There is a third valve portion 50 where the plunger 6 moves up and down that is located between a first valve portion 54 and a second valve portion 56.

The first valve portion 54 receives fluid, e.g., coolant, into the valve 2 and includes the inlet port 46. The second valve portion 56 transmits fluid, e.g., coolant, from the valve 2 and includes the outlet port 48.

As shown in FIG. 3, when the valve 2 is closed, the plunger 6 is positioned as close to the stepper motor 16 as possible in a first position and the plunger completely blocks the flow of fluid, e.g., coolant, in the third valve portion 50 so that the fluid, e.g., coolant, flowing into the inlet port 46, through the first valve portion 54 is blocked by the first portion 9 of the plunger 6 so that fluid, e.g., coolant, cannot go into the second valve portion 56 that is in fluid communication with the outlet port 48 and the fluid, e.g., coolant, does not have any access to the fluid passage 135.

As shown in FIG. 2, when the valve 2 is open, the plunger 6 is positioned on the bottom of the valve body 32 in a second position and as far away from the stepper motor 16 as possible. This allows fluid, e.g., coolant, to flow between the inlet port 46, through the first valve portion 54, and then into the third valve portion 50 through the fluid passage 135 in the plunger 6. Fluid, e.g., coolant, then flows out through the second valve portion 56 and then the outlet port 48. Therefore, the present invention includes a first position where the valve is fully closed and a second position where the valve is fully open. However, it is only this specific illustrative embodiment where the position of the plunger 6 to the stepper motor 16 has any relevance to these two positions and with slight modifications to the valve 2 the relationship of the position of the plunger 6 to the stepper motor 16 and these two positions can be reversed.

Due to the radial seal 42, any high pressure differential pressure across the valve 2 between the first valve portion 54 and the second valve portion 56 has a negligible effect on the pressure balance on the plunger 6 caused by the stepper motor 16 and the biasing mechanism, return spring 4. Therefore, the pressure drop across the valve 2 is relatively low due to the radial seal 42.

Under normal operating conditions, the stepper motor 16 will be powered to rotate the screw 12 in either a clockwise or counterclockwise direction to move the plunger 6 either up or down. There are two operating conditions. The first condition is the full opening region. The full opening region is from when the plunger 6 is as far as possible to the stepper motor 16 to being extended to the point where the plunger 6 is in contact with the bottom of the valve body 32 to allow full fluid flow. The second operating condition is when the valve is in a fully closed position. This is when the plunger 6 is as close as possible to the stepper motor 16 and the plunger 6 is in contact with the radial seal 42. Between the first operating condition and the second operating condition, the valve 2 controls the fluid flow in a step-wise linear manner, which can be dynamically altered based on operating conditions to provide a fully variable fluid flow.

The degrees of rotation for the stepper motor 16 can range from about zero (0) degrees per step to about one hundred and eighty (180) degrees per step and preferably from about twenty (20) degrees per step to about fifty (50) degrees per step and optimally about 1.8 degrees per step. The pitch of the screw 12 can range from about two (2) male protrusions or threads 10 per inch to about fifty (50) male protrusions or threads 10 per inch and preferably from about three (3) male protrusions or threads 10 per inch to about eight (8) male protrusions or threads 10 per inch and optimally about five (5) male protrusions or threads 10 per inch. Therefore, the plunger 6 can travel from about 10 inches per step to about 0.000001 inches per step and preferably from about 0.01 inches per step to about 0.001 inches per step and optimally about 0.001 inches per step. As an illustrative example, at 1.8 degrees per step with the pitch of the screw 12 at five (5) male protrusions or threads 10 per inch and the plunger 6 traveling 0.001 inches per step, results in 500 steps for the plunger 6 to travel one (0.5) inch for very precise flow control.

Figure 7:
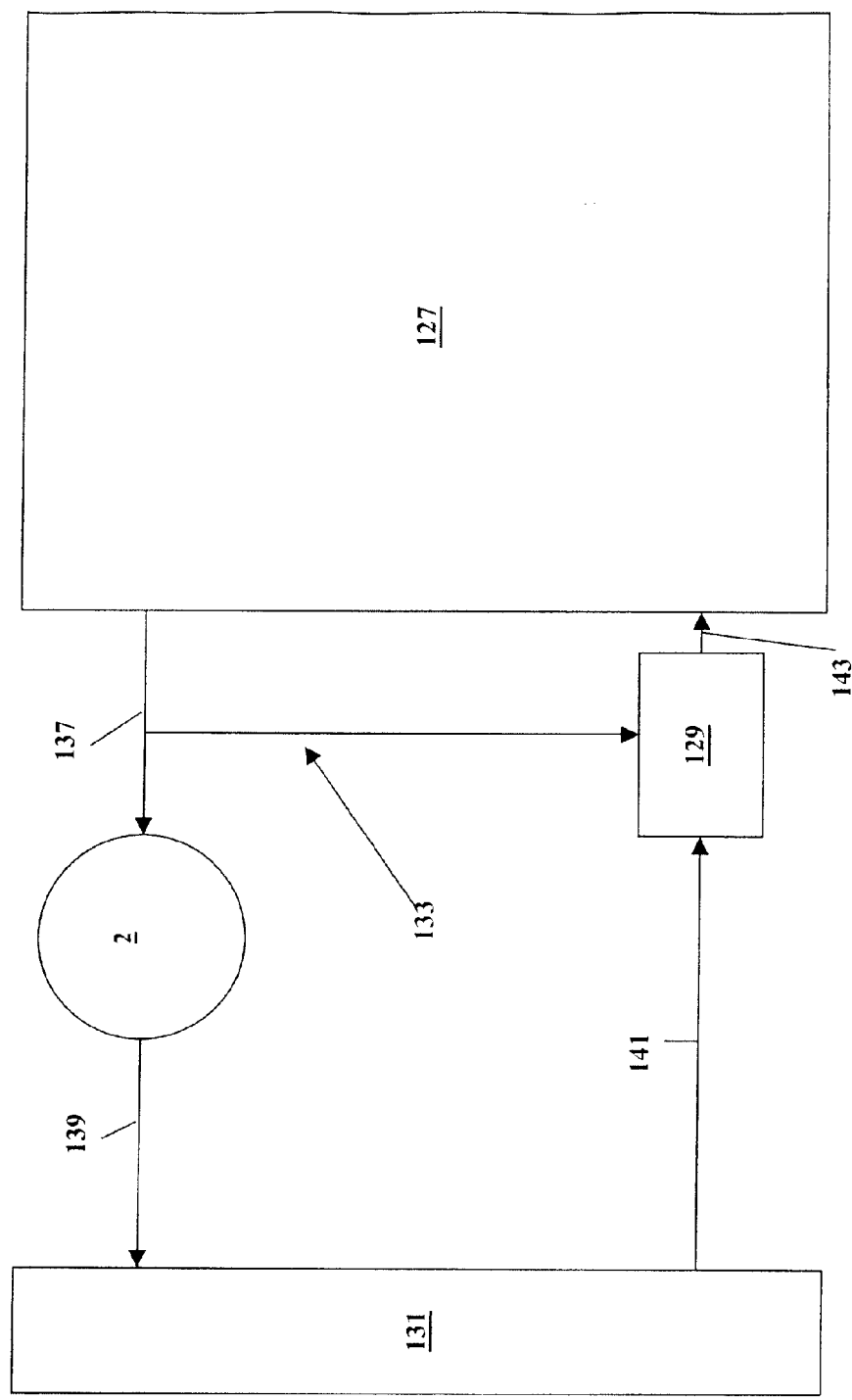
FIG. 7 is a basic schematic of a fluid, e.g., coolant, system for a vehicle that illustrates an engine, a radiator, a pump, and a bypass loop where fluid, e.g., coolant, flow through the bypass loop is controlled by the valve of the present invention.

Referring now to FIG. 7, as one illustrative, but nonlimiting application, the valve 2 can be utilized to provide fluid, e.g., coolant, flow from an engine 127 through a first fluid conduit 137 and into either the valve 2 or a bypass loop 133. The valve 2 controls the flow of fluid, e.g., coolant, into a radiator 131 via a third fluid conduit 139. The fluid, e.g., coolant, then goes into a fluid pump 129 from the radiator 131 via a fourth fluid conduit 141 and the bypass loop 133 and then back into the engine 127 via a second fluid conduit 143. By diverting more fluid, e.g., coolant, into the bypass loop 133 rather than the radiator 131, the engine 127 can run hotter with greater fuel efficiency and reduced emissions. The valve 2 can be operated from sensor data from a processor (not shown) to maximize performance of the engine 127. Preferably look-up tables can be utilized in conjunction with the sensor data. This will control the temperature of the engine 127 through a complete range of fluid flow rather than a thermostat being merely off or turned on. The previously mentioned failsafe feature of the valve 2 is important so that fluid, e.g., coolant, can always be provided to the radiator 131 to prevent damage to the engine 127.

Figure 8:
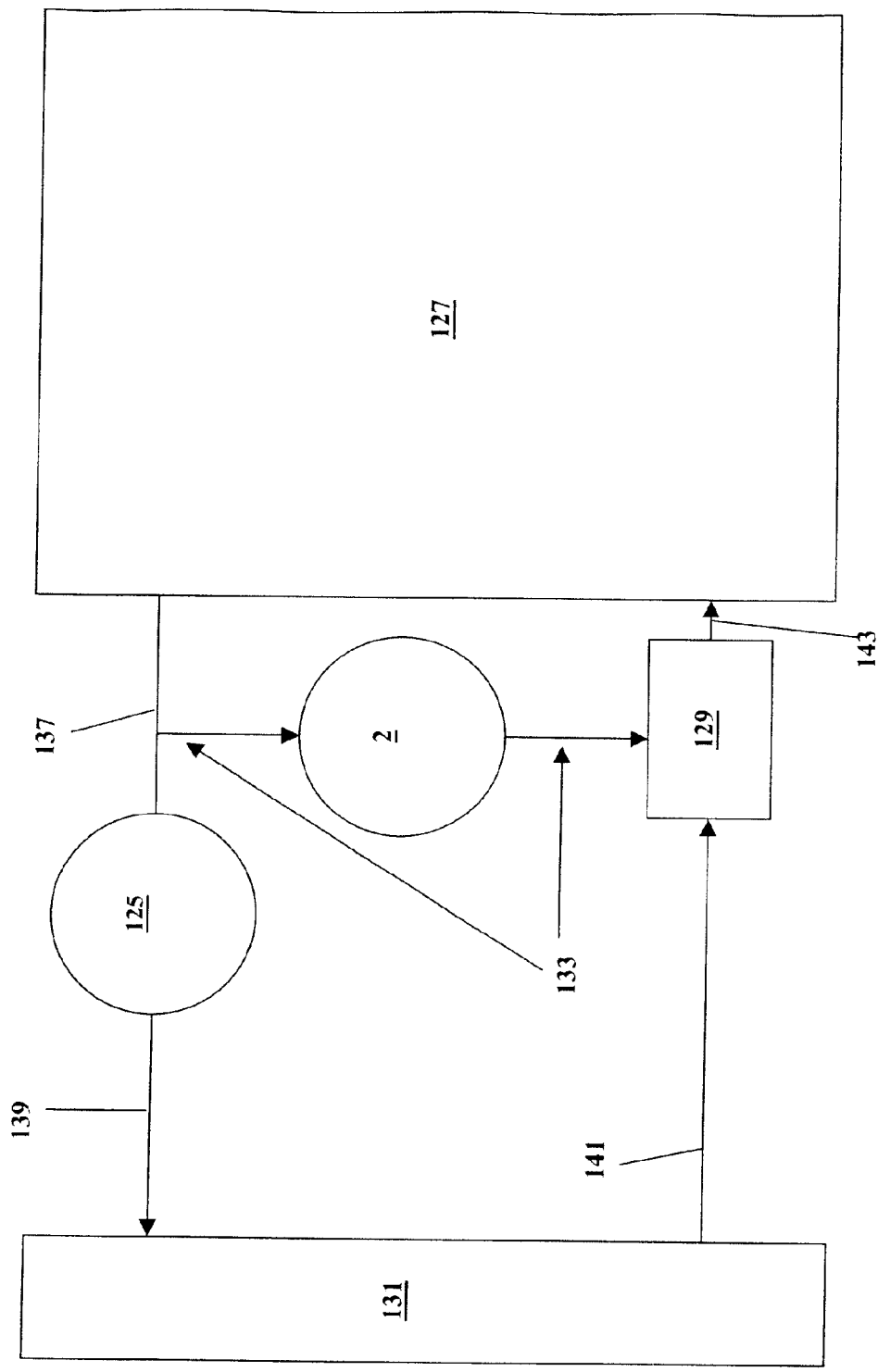
FIG. 8 is a basic schematic of a fluid, e.g., coolant, system for a vehicle that illustrates an engine, a radiator, a pump, a thermostat and a bypass loop where fluid, e.g., coolant, flow through the bypass loop is controlled by the valve of the present invention.

Referring now to FIG. 8, as another illustrative, but nonlimiting application, the valve 2 can be utilized to control fluid, e.g., coolant, flow through the bypass loop 133 from the engine 127 from a first fluid conduit 137. The standard thermostat 125 has not reached the set point, all flow of fluid, e.g., coolant, from the fluid pump 129 through a second fluid conduit 143 and then into the engine 127 and then into the bypass loop 133 via the first fluid conduit 137 and then back into the fluid pump 129. By controlling the amount of fluid flow in the bypass loop 133, the engine 127 can run hotter with greater fuel efficiency and reduced emissions. The valve 2 can be operated from sensor data from a processor (not shown) to maximize performance of the engine 127. Preferably, look-up tables can be utilized in conjunction with the sensor data. This will control the temperature of the engine 127 through a complete range of fluid flow until the set point of the thermostat 125 is reached. At this point, the valve 2 can be operated in conjunction with the thermostat 125 to accurately control the temperature of the engine 127 with fluid going through the thermostat 125 via the first fluid conduit 137 and into a radiator 131 via a third fluid conduit 139. From the radiator 131 fluid goes back into the inlet for the fluid pump 129 via a fourth conduit 141.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A valve for regulating fluid flow comprising:
   a stepper motor;
   a first valve portion that includes an inlet port for receiving fluid into the valve;
   a second valve portion that includes an outlet port for dispensing fluid from the valve;
   a third valve portion located between the first valve portion and the second valve portion;
   a first member that is rotatable and operatively attached to the stepper motor;
   a second member, having a first portion and a second portion, which is engageable with the first member for linear movement of the second member between a first position and a second position when the first member is rotated by the stepper motor, wherein the first member and the second member are located within the third valve portion and the second member having a flow path therethrough for directing fluid flow in a direction parallel to the direction of the linear movement of the second member and the first portion of the second member located in the first position can block fluid flow between the first valve portion and the third valve portion through the flow path and the second portion of the second member located in the second position can allow fluid flow between the first valve portion and the third valve through the flow path; and
   a biasing mechanism that is in contact with the second member and operable to move the second member to the second position in the event the stopper motor is not powered.

2. The valve for regulating fluid flow as set forth in claim 1, wherein the stepper motor, the first valve portion, the second valve portion, the third valve portion, the first member, and the second member are all enclosed within a housing.

3. The valve for regulating fluid flow as set forth in claim 1, wherein the biasing mechanism includes a return spring.

4. The valve for regulating fluid flow as set forth in claim 1, wherein the first member includes a screw having a plurality of protrusions.

5. The valve for regulating fluid flow as set forth in claim 1, wherein the second member includes a plunger having a plurality of indentations.

6. The valve for regulating fluid flow as set forth in claim 5, wherein the plunger includes at least one fluid flow passage forming at least a portion of the flow path.

7. The valve for regulating fluid flow as set forth in claim 5, wherein the plunger includes a cylindrical portion, having an outer circumference and includes at least one protrusion on the outer circumference.

8. The valve for regulating fluid flow as set forth in claim 5, wherein the plunger includes a plurality of triangular support members.

9. The valve for regulating fluid flow as set forth in claim 2, further including a cover member that is located between the stepper motor and the third valve portion.

10. The valve for regulating fluid flow as set forth in claim 9, wherein the cover member includes at least one support portion for the stepper motor and at least one outer member that is secured to the valve housing.

11. The valve for regulating fluid flow as set forth in claim 9, wherein the cover member includes at least one protruding member that is capable of being positioned between a plurality of retaining members on the second member to restrict rotation of the second member.

12. The valve for regulating fluid flow as set forth in claim 9, further including a cover member located between the stepper motor and the third valve portion, wherein the cover member includes an outer flange.

13. The valve for regulating fluid flow as set forth in claim 12, further including a radial seal located within between the outer flange and the housing in the third valve portion.

14. The valve for regulating fluid flow as set forth in claim 13, wherein the radial seal includes at least one rectangular portion and at least one c-shaped portion.

15. The valve for regulating fluid flow as set forth in claim 9, further including at least one first o-ring located between the cover member and the first member.

16. The valve for regulating fluid flow as set forth in claim 5, wherein the plunger, having an outer circumference, includes a plurality of protrusions on the outer circumference and further including at least one second o-ring located between two adjacent protrusions on the outer circumference of the plunger.

17. The valve for regulating fluid flow as set forth in claim 1, further including a terminal connector mechanism that provides at least one electrical connection to the stepper motor.

18. The valve for regulating fluid flow as set forth in claim 1, wherein the inlet port for the valve is fluidly connected to an engine and a bypass loop for controlling fluid flow into a radiator, wherein the outlet port of the valve is fluidly connected to the radiator.

19. The valve for regulating fluid flow as set forth in claim 1, wherein the inlet port for the valve is fluidly connected to a bypass loop that receives fluid flow from an engine that was pumped into the engine from a water pump, wherein the outlet port of the valve is fluidly connected to an inlet port for the water pump.

20. A valve for regulating fluid flow comprising:
    a stepper motor;
    a first valve portion that includes an inlet port for receiving fluid into the valve;

a second valve portion that includes an outlet port for dispensing fluid from the valve;

a third valve portion located between the first valve portion and the second valve portion;

a first member that is rotatable and operatively attached to the stepper motor;

a housing that encloses the stepper motor, the first valve portion, the second valve portion, the third valve portion, the first member, the second member and the biasing mechanism;

a second member, having a first portion and a second portion, which is engageable with the first member for linear movement of the second member between a first position and a second position when the first member is rotated by the stepper motor, wherein the first member and the second member are located within the third valve portion and the second member having a flow path therethrough for directing fluid flow in a direction generally parallel to the direction of the linear movement of the second member and the first portion of the second member located in the first position can block fluid flow between the first valve portion and the third valve portion through the flowpath and the second portion of the second member located in the second position can allow fluid flow between the first valve portion and the third valve through the flow path; and a biasing mechanism that is in contact with the second member and is operable to move the second member to the second position in the event the stepper motor is not powered.

21. A valve for regulating fluid flow comprising:

a stepper motor;

a first valve portion that includes an inlet port for receiving fluid into the valve;

a second valve portion that includes an outlet port for dispensing fluid from the valve;

a third valve portion located between the first valve portion and the second valve portion;

a first member that is rotatable and operatively attached to the stepper motor;

a housing that encloses the stepper motor, the first valve portion, the second valve portion, the third valve portion, the first member, the second member and biasing mechanism;

a second member, having a first portion and a second portion, that is engageable with the first member for linear movement of the second member between a first position and a second position when the first member is rotated by the stepper motor, wherein the first member and the second member are located within the third valve portion and the second member having a flow path therethrough for directing fluid flow in a direction generally parallel to the direction of the linear movement of the second member and the first portion of the second member located in the first position can completely block fluid flow between the first valve portion and the third valve portion through the flow path and the second portion of the second member located in the second position can allow fluid flow between the first valve portion and the third valve portion through the flow path, wherein the valve is capable of controlling fluid flow going into a bypass loop and fluid flow going into a radiator; and a biasing mechanism that is in contact with the second member and is operable to move the second member to the second position in the event the stepper motor is not powered.

22. A valve for regulating fluid flow comprising:

a stepper motor;

a first valve portion that includes an inlet port for receiving fluid into the valve;

a second valve portion that includes an outlet port for dispensing fluid from the valve;

a third valve portion located between the first valve portion and the second valve portion;

a screw, having a plurality of protrusions, that is rotatable and operatively attached to the stepper motor;

a plunger, having a first portion and a second portion and a plurality of indentations, that is engageable with the plurality of protrusions on the screw for linear movement of the plunger between a first position and a second position when the screw is rotated by the stepper motor, wherein the screw and the plunger are located within the third valve portion and the plunger having a flow path therethrough for directing fluid flow in a direction generally parallel to the direction of the linear movement of the plunger and the first portion of the plunger located in the first position can block fluid flow between the first valve portion and the third valve portion and the second portion of the plunger located in the second position can allow fluid flow between the first valve portion and the third valve portion through the flow path;

a return spring that is in contact with the plunger and is operable to move the plunger to the second position in the event the stepper motor is not powered; and a housing that encloses the stepper motor, the first valve portion, the second valve portion, the third valve portion, the screw, the plunger and the return spring.

23. The valve for regulating fluid flow as set forth in claim 22, further including a cover member that is located between the stepper motor and the third valve portion.

24. The valve for regulating fluid flow as set forth in claim 23, wherein the cover member includes at least one protruding member that is capable of being positioned between a plurality of retaining members on the plunger to restrict rotation of the plunger.

25. The valve for regulating fluid flow as set forth in claim 22, further including a cover member located between the stepper motor and the third valve portion, wherein the cover member includes an outer flange.

26. The valve for regulating fluid flow as set forth in claim 25, further including a radial seal located between the outer flange and the housing in the third valve portion.

27. The valve for regulating fluid flow as set forth in claim 23, wherein the plunger, having an outer circumference, includes a plurality of protrusions of the outer circumference and further including at least one second o-ring located between two adjacent protrusions on the outer circumference of the plunger.

28. The valve for regulating fluid flow as set forth in claim 23, wherein the inlet port for the valve is fluidly connected to an engine and a bypass loop for controlling fluid flow into a radiator, wherein the outlet port of the valve is in fluidly connected to the radiator.

29. The valve for regulating fluid flow as set forth in claim 23, wherein the inlet port for the valve is fluidly connected to a bypass loop that receives fluid flow from a engine that was pumped into the engine from a water pump, wherein the outlet port of the valve is fluidly connected to an inlet for the water pump.

30. A method for regulating fluid flow with a valve comprising:

rotating a first member that is operatively attached to a stepper motor within a valve, that includes a first valve portion having an inlet port for receiving fluid into the valve, a second valve portion having an outlet port for dispensing fluid from the valve and a third valve portion located between the first valve portion and the second valve portion; and moving a second member generally linearly in a first direction the second member having a flow path therethrough and a first portion and a second portion, from a first position to a second position through interengagement with the rotating first member, wherein the first portion of the second member located in the first position can block fluid flow between the first valve portion and the third valve portion through the flow path and the second portion of the second member located in the second position can allow fluid flow between the first valve portion and the third valve portion through the flow path in a direction generally parallel to the first direction.

31. The method for regulating fluid flow with a valve as set forth in claim 30, further includes applying force against the second member with a biasing mechanism and moving the second member to the second position if power is lost to the stepper motor.

32. The method for regulating fluid flow with a valve as set forth in claim 30, further including utilizing the valve for controlling the fluid flow from the engine into a radiator.

33. The method for regulating fluid flow with a valve as set forth in claim 30, further including utilizing the valve for controlling the fluid flow from the engine into a bypass line.

34. A method for regulating fluid flow with a valve comprising:

rotating a screw, having a plurality of protrusions, that is operatively attached to a stepper motor within a valve, having a first valve portion having an inlet port for receiving fluid into the valve, a second valve portion having an outlet port for dispensing fluid from the valve and a third valve portion located between the first valve portion and the second valve portion; and moving a plunger generally linearly in a first direction, said plunger having a first portion that includes a cylindrical portion with a flow path therethrough and a second portion that includes at least one orifice and a plurality of indentations, that engages the plurality of protrusions on the screw for linear movement of the plunger between a first position and a second position when the screw is rotated by the stepper motor against a force applied by a return spring, wherein the first portion of the plunger located in the first position can block fluid flow between the first valve portion and the third valve portion through the flow path and the second portion of the second member located in the second position can allow fluid flow between the first valve portion and the third valve portion through the flow path in a direction generally parallel to the first direction.

35. The method for regulating fluid flow with a valve as set forth in claim 34, further including sealing the valve with a cover member located between the stepper motor and the third valve portion, wherein the cover member includes an outer flange, a radial seal located within between the outer flange and the housing in the third valve portion, at least one first o-ring located between the cover member and the first member and at least one second o-ring located between two adjacent protrusions on the outer circumference of the plunger.

36. The method for regulating fluid flow with a valve as set forth in claim 34, further including providing electrical connections to the stepper motor through a terminal connector.

37. The method for regulating fluid flow with a valve as set forth in claim 34, further including restricting rotation of the plunger by engaging at least one protruding member on a cover member with a plurality of retaining members on the plunger, wherein the cover member is located between the stepper motor and the third valve portion.

38. The method for regulating fluid flow with a valve as set forth in claim 34, further including controlling fluid flow from an engine to a radiator with the valve.

39. The method for regulating fluid flow with a valve as set forth in claim 34, further including controlling fluid flow from an engine to a bypass loop with the valve.

* * * * *